(12) United States Patent
Peet et al.

(10) Patent No.: US 11,344,835 B2
(45) Date of Patent: May 31, 2022

(54) FILTER ASSEMBLY FOR AN ENCLOSURE

(71) Applicant: Donaldson Company, Inc., Minneapolis, MN (US)

(72) Inventors: Roger Peet, Eden Prairie, MN (US); Daniel Dotzler, Webster, MN (US)

(73) Assignee: Donaldson Company, Inc., Bloomington, MN (US)

( * ) Notice: Subject to any disclaimer, the term of this patent is extended or adjusted under 35 U.S.C. 154(b) by 471 days.

(21) Appl. No.: 16/543,838

(22) Filed: Aug. 19, 2019

(65) Prior Publication Data

US 2020/0061511 A1 Feb. 27, 2020

Related U.S. Application Data

(60) Provisional application No. 62/720,551, filed on Aug. 21, 2018.

(51) Int. Cl.
*B01D 53/02* (2006.01)
*B01D 46/00* (2022.01)
*B01D 46/54* (2006.01)
*B01D 71/36* (2006.01)

(52) U.S. Cl.
CPC ....... *B01D 46/0036* (2013.01); *B01D 46/543* (2013.01); *B01D 71/36* (2013.01); *B01D 2253/102* (2013.01); *B01D 2253/25* (2013.01)

(58) Field of Classification Search
CPC .......... B01D 2253/102; B01D 2253/25; B01D 2311/2626; B01D 46/0036; B01D 46/543; B01D 63/08; B01D 67/0088; B01D 69/12; B01D 71/36
See application file for complete search history.

(56) References Cited

U.S. PATENT DOCUMENTS

| | | | |
|---|---|---|---|
| 5,550,038 A | 3/1996 | Dauber et al. |
| 5,593,482 A | 1/1997 | Dauber et al. |
| 5,876,487 A | 3/1999 | Dahlgren et al. |
| 5,997,614 A | 12/1999 | Tuma et al. |
| 6,143,058 A | 11/2000 | Dahlgren et al. |
| 6,146,446 A | 11/2000 | Tuma et al. |
| 6,214,095 B1 | 4/2001 | Logan et al. |
| 6,296,691 B1 | 10/2001 | Gidumal |
| 6,395,073 B1 | 5/2002 | Dauber |

(Continued)

FOREIGN PATENT DOCUMENTS

| | | |
|---|---|---|
| CN | 104797926 B | 12/2017 |
| EP | 2 404 652 B1 | 5/2017 |

(Continued)

*Primary Examiner* — Christopher P Jones
(74) *Attorney, Agent, or Firm* — Mueting Raasch Group

(57) ABSTRACT

The technology disclosed herein relates to a filter assembly. The filter assembly has a double-sided adhesive layer having a first side and a second side and defining a filter opening. A first membrane extends over the filter opening and is directly coupled to the first side of the double-sided adhesive layer about the filter opening. An adsorbent element is directly coupled to the first membrane, where the adsorbent element and the first membrane are coextensive. A second membrane encapsulates the first membrane and the adsorbent element. The second membrane is directly coupled to the first side of the double-sided adhesive layer around the first membrane and adsorbent element.

20 Claims, 4 Drawing Sheets

(56) References Cited

U.S. PATENT DOCUMENTS

| | | |
|---|---|---|
| 6,491,741 B2 | 12/2002 | Tuma et al. |
| 6,709,498 B2 | 3/2004 | Tuma |
| 6,726,745 B2 | 4/2004 | Tuma et al. |
| 6,936,093 B2 | 8/2005 | Isogawa et al. |
| 7,125,433 B2 | 10/2006 | Garikipati et al. |
| 7,166,142 B2 | 1/2007 | Tuma et al. |
| 7,291,208 B2 | 11/2007 | Dauber et al. |
| 7,306,659 B2 | 12/2007 | Gorton et al. |
| 7,318,859 B2 | 1/2008 | Ball et al. |
| 7,404,836 B2 | 7/2008 | Garikipati et al. |
| 7,591,868 B2 | 9/2009 | Johnson |
| 7,842,287 B2 | 11/2010 | Miller, III et al. |
| 8,568,503 B2 | 10/2013 | Sasaki et al. |
| 8,979,811 B2 | 3/2015 | Keleny et al. |
| 9,114,349 B2 | 8/2015 | Leier et al. |
| 9,230,608 B2 | 1/2016 | Ellison et al. |
| 9,418,710 B1 | 8/2016 | Choe, Jr. et al. |
| 9,651,475 B2 | 5/2017 | Hirai et al. |
| 10,905,991 B2 * | 2/2021 | Lu ........................ G11B 25/043 |
| 2006/0032371 A1 | 2/2006 | Dauber et al. |
| 2006/0032372 A1 | 2/2006 | Dauber et al. |
| 2006/0191249 A1 | 8/2006 | Gogins et al. |
| 2009/0090245 A1 | 4/2009 | Olszewski |
| 2009/0268475 A1 | 10/2009 | Ball et al. |
| 2011/0186513 A1 * | 8/2011 | Vuong ........................ C02F 1/28 |
| | | 210/636 |
| 2011/0277638 A1 * | 11/2011 | Li ........................ B01D 39/1692 |
| | | 96/139 |
| 2012/0060693 A1 | 3/2012 | Sasaki et al. |
| 2012/0270229 A1 * | 10/2012 | Siciliano .............. G01N 33/558 |
| | | 435/7.1 |
| 2013/0343973 A1 | 12/2013 | Solovyov et al. |
| 2014/0377143 A1 | 12/2014 | Ellison et al. |
| 2017/0056836 A1 * | 3/2017 | Voigt ................ B01D 39/1692 |
| 2021/0107808 A1 * | 4/2021 | Goertz ........................ C02F 1/44 |

FOREIGN PATENT DOCUMENTS

| | | |
|---|---|---|
| KR | 10-2007-0092226 A | 9/2007 |
| WO | WO 2006/053046 A1 | 5/2006 |
| WO | WO 2011/143551 A1 | 11/2011 |
| WO | WO 2017/040291 A1 | 3/2017 |

* cited by examiner

FILTER ASSEMBLY FOR AN ENCLOSURE

This application is a non-provisional application claiming priority to U.S. Provisional Application No. 62/720,551 filed Aug. 21, 2018, and the entire contents of the U.S. Provisional Application are incorporated herein by reference.

TECHNOLOGICAL FIELD

The present disclosure is generally related to adsorbent filters. More particularly, the present disclosure is related to adsorbent filters for sensor enclosures.

SUMMARY

The present disclosure relates to a filter assembly. A double-sided adhesive layer has a first side and a second side and defines a filter opening. A first membrane extends over the filter opening and is directly coupled to the first side of the double-sided adhesive layer about the filter opening. An adsorbent element is directly coupled to the first membrane, where the adsorbent element and the first membrane are coextensive. A second membrane encapsulates the first membrane and the adsorbent element, where the second membrane is directly coupled to the first side of the double-sided adhesive layer around the first membrane and adsorbent element.

In some such embodiments, the filter assembly has a manually releasable liner coupled to the second side of the double-sided adhesive layer. Additionally or alternatively, the double-sided adhesive layer has a carrier layer with a first adhesive disposed on the first side and a second adhesive disposed on the second side. Additionally or alternatively, the first membrane is polytetrafluoroethylene (PTFE). Additionally or alternatively, the second membrane is PTFE. Additionally or alternatively, the first membrane has an oleophobic coating. Additionally or alternatively, the adsorbent element has activated carbon impregnated with a base salt. Additionally or alternatively, the adsorbent element is a tablet. Additionally or alternatively, the adsorbent element is a web. Additionally or alternatively, the second membrane is in direct contact with the adsorbent element.

The present disclosure also relates to a sensor device. A substantially sealed sensor enclosure defines a sensor opening and a breather opening. An optical sensor has a lens coupled to the sensor enclosure about the sensor opening. A filter assembly is disposed in the sensor enclosure. The filter assembly has an adhesive layer, a first membrane, an adsorbent element, and a second membrane. The adhesive layer is coupled to the sensor enclosure about the breather opening, where the adhesive layer defines a filter opening overlapping with the breather opening. The first membrane extends over the breather opening and is directly coupled to the adhesive layer about the filter opening. The adsorbent element is directly coupled to the first membrane, where the adsorbent element and the first membrane are coextensive. The second membrane encapsulates the first membrane and the adsorbent element, where the second membrane is directly coupled to the adhesive layer about the first membrane and adsorbent element.

In some such embodiments, the adhesive layer has a carrier layer having a first side and a second side and adhesive disposed on the first side and the second side. Additionally or alternatively, the first membrane is PTFE. Additionally or alternatively, the second membrane is PTFE. Additionally or alternatively, the first membrane has an oleophobic coating. Additionally or alternatively, the adsorbent element has activated carbon impregnated with a base salt. Additionally or alternatively, the adsorbent element is a tablet. Additionally or alternatively, the adsorbent element is a web. Additionally or alternatively, the second membrane is in direct contact with the adsorbent element. Additionally or alternatively, the sensor device is a lidar sensor.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

Figure 1:
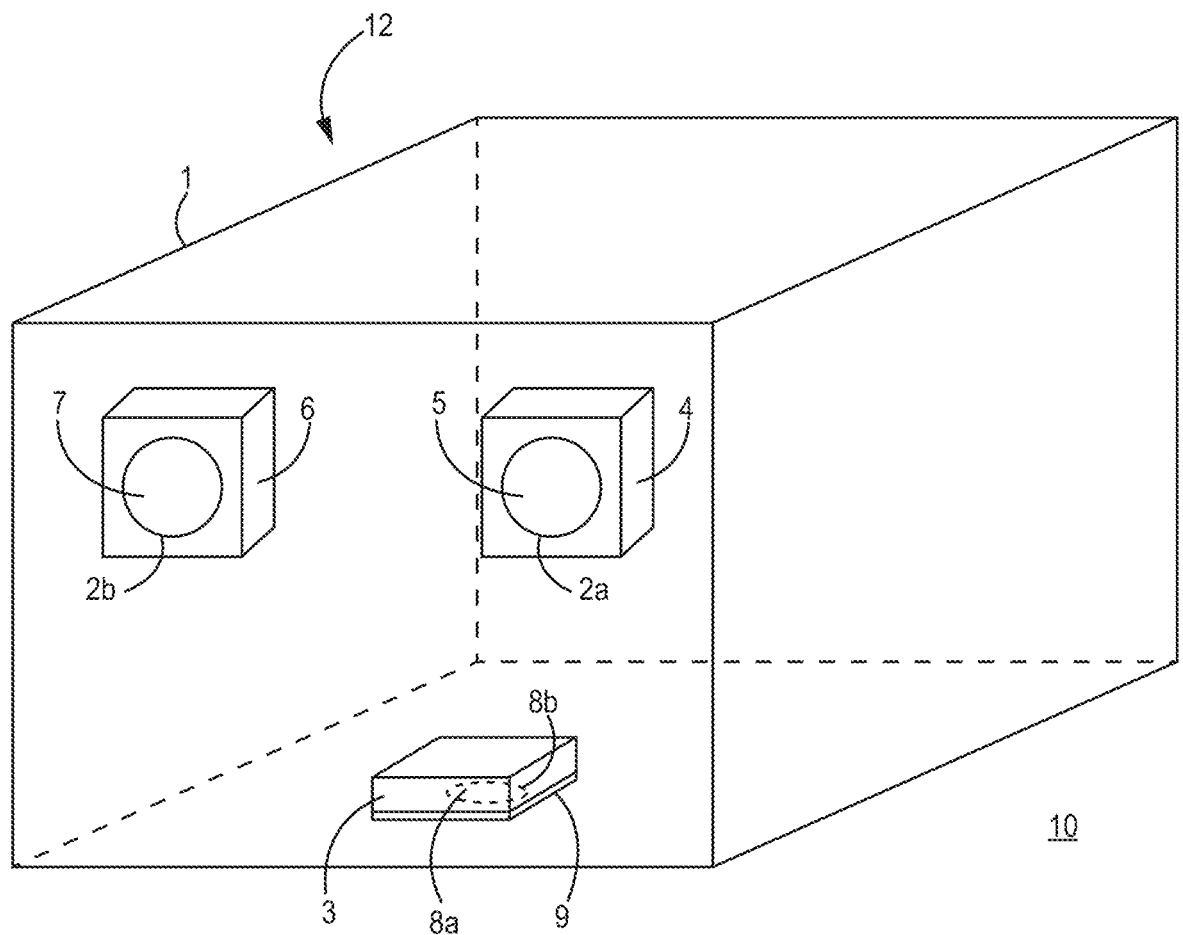
FIG. 1 depicts a schematic view of an example implementation of the technology disclosed herein.

FIG. 1 depicts an example implementation of the technology disclosed herein. The example implementation is a sensor device 12. A filter assembly 3 is disposed in an enclosure 1. The enclosure 1 can be consistent with various types of enclosures and is generally configured to house components. In some embodiments the enclosure 1 is a sensor enclosure such as an optical sensor enclosure. In various embodiments the enclosure 1 is substantially sealed sensor enclosure, where "substantially sealed" is defined herein as being resistant to the ingress of liquid water. The enclosure 1 can define one or more sensor openings 2a, 2b in some embodiments, and system components can be sealably coupled around the sensor openings 2a, 2b such that the enclosure is substantially sealed.

In some embodiments an optical sensor 4 is disposed in the enclosure 1. The optical sensor 4 can have a first lens 5 that is sealably coupled to the enclosure 1 about a first sensor opening 2a. The enclosure 1 can also house a light emitter assembly 6, such as a laser emitter, that has a second lens 7 that is sealably coupled to the enclosure 1 about the second sensor opening 2b. In some embodiments the enclosure 1 is a Lidar sensor enclosure. In some embodiments the enclosure 1 is an automotive optical sensor enclosure.

In the current example, the enclosure 1 is rigid, but in some other embodiments the enclosure is flexible. In an example alternate embodiment, the enclosure can be a flexible plastic or rubber material. In such an example implementation, the enclosure can be an ostomy bag.

The filter assembly 3 is generally configured to be disposed in the enclosure 1. The filter assembly 3 is in communication with the interior of the enclosure 1 and also with the environment outside of the enclosure 1. The filter assembly 3 is generally configured to allow pressure equalization of the enclosure 1 with the outside environment 10. In some embodiments, the filter assembly 3 is configured to provide water and dust ingress protection (such as to achieve an IP66/IP68 rating) to the enclosure 1. In some embodiments, the filter assembly 3 is configured to adsorb moisture vapor to prevent ingress of moisture vapor to the enclosure 1. In some embodiments the filter assembly 3 is configured to adsorb gaseous chemical constituents within the enclosure 1 such as acid gases. The filter assembly 3 can generally be configured to operate in a temperature range of −40° C. to 125° C.

The enclosure 1 defines a filter opening 8a (shown in broken lines) that is configured to be obstructed by the filter assembly 3. In this example, the filter assembly 3 has an adhesive layer 9 that is coupled to the enclosure about the filter opening 8a. The adhesive layer 9 defines an adhesive layer opening 8b that overlaps with the filter opening 8a. In various embodiments the adhesive layer opening 8b is substantially coextensive with the breather filter opening 8a.

Figure 2:
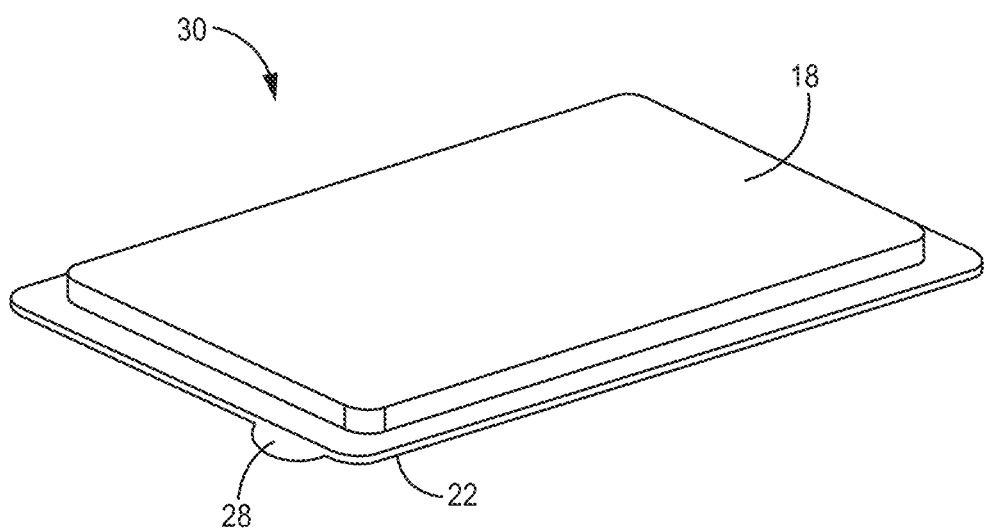
FIG. 2 depicts a perspective view of an example filter assembly consistent with some embodiments.
Figure 3:
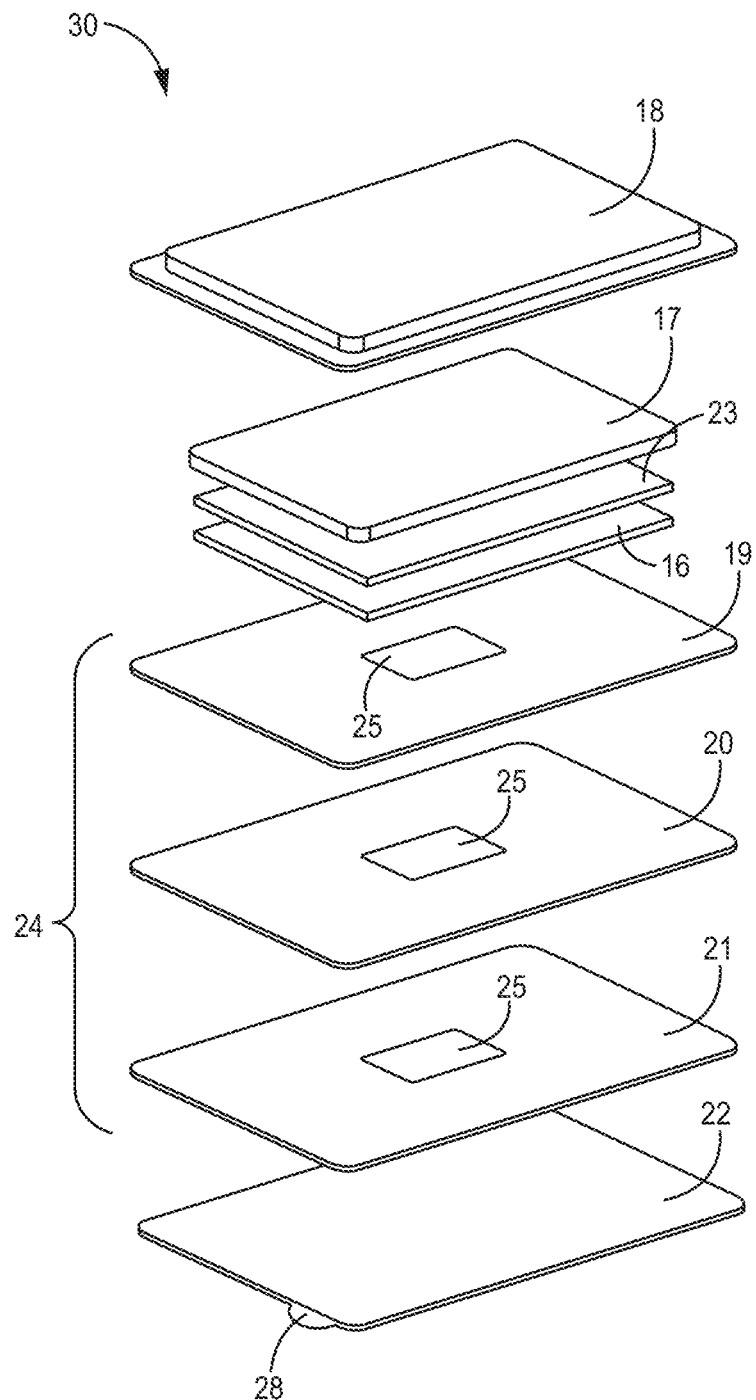
FIG. 3 depicts an example exploded view of the example filter assembly of FIG. 2.
Figure 4:
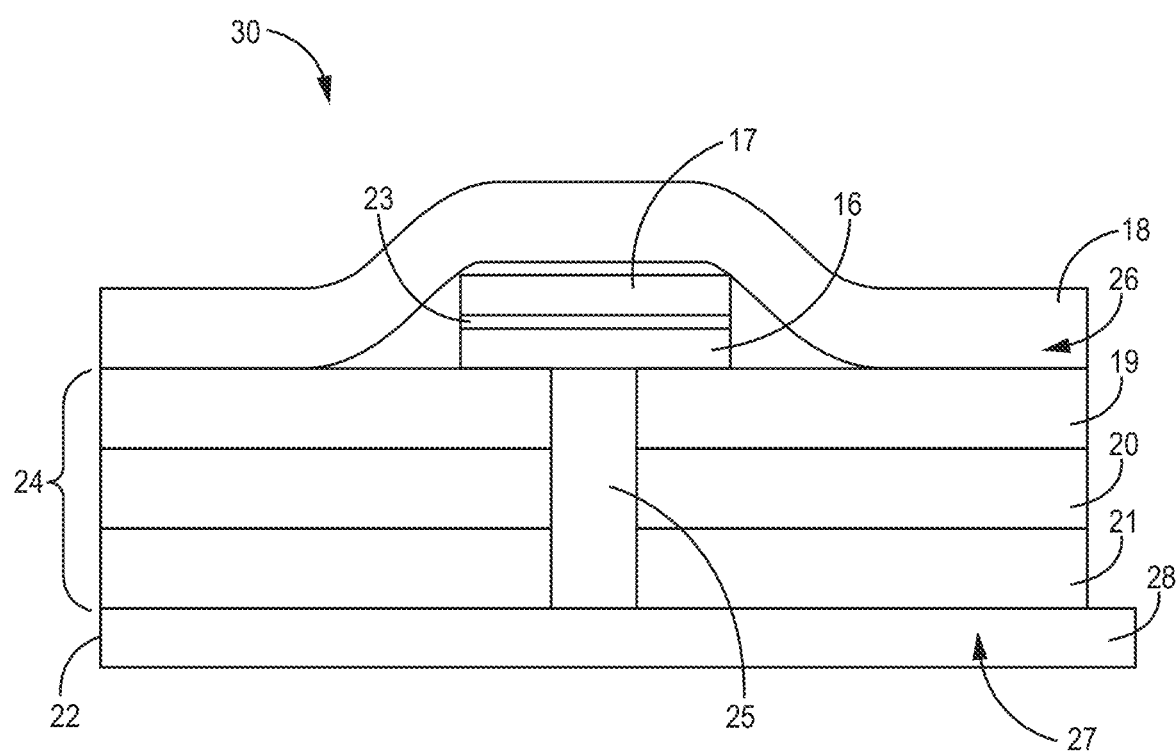
FIG. 4 depicts a cross-sectional view of the example filter assembly of FIG. 3.

FIG. 2 depicts an example filter assembly 30 consistent with various embodiments, including the example implementation of FIG. 1. FIG. 3 depicts an example exploded view of a filter assembly 30 of FIG. 2, and FIG. 4 depicts an example cross-sectional view of a filter assembly of 20 of FIG. 3. The filter assembly 30 generally has a first membrane 16, an adsorbent element 17, a second membrane 18, and an adhesive layer 24.

The adhesive layer 24 is configured to secure the filter assembly 30 to an enclosure, such as the enclosure depicted in FIG. 1. The adhesive layer 24 can have a variety of configurations, and in the current example, the adhesive layer 24 is a double-sided adhesive layer having a first side 26 and a second side 27. In particular, the adhesive layer 24 has a first adhesive 19, a second adhesive 21 and a carrier layer 20. The first adhesive 19 is disposed on a first side of the carrier layer 20 and the second adhesive 21 is disposed on a second side of the carrier layer 20.

The first adhesive 19 directly couples to each of the first membrane 16 and the second membrane 18. The second adhesive 21 is configured to directly couple to an interior surface of an enclosure (such as that depicted in FIG. 1). In some embodiments, the first adhesive 19 and/or the second adhesive 21 can have a high temperature acrylic foam adhesive, although other types of adhesive are certainly contemplated. The carrier layer 20 can be a film such as a polyester film. Each of the first adhesive 19, second adhesive 21, and carrier layer 20 mutually define the filter opening 25.

The adhesive layer 24 defines a filter opening 25. The filter opening 25 defines an airflow pathway through the filter assembly 30. The filter opening 25 is configured to be aligned with a breather opening of an enclosure, such as described and depicted above with reference to FIG. 1.

Prior to installation in an enclosure, a release liner 22 can be coupled to the second side 27 of the adhesive layer 24. The release liner 22 can be configured to prevent the adhesive layer 24 from contacting anything prior to installation. The release liner 22 can be removed from the adhesive layer 24 prior to adhering the filter assembly 30 to a surface, such as an inside surface of an optical sensor housing. In various embodiments the release liner 22 defines a tab 28 that is configured to extend outward from the filter assembly 30. The tab 28 can be a manually-engageable tab and the release liner 22 can be a manually releasable liner.

The first membrane 16 generally facilitates diffusion of gas between an enclosure and the outside environment. The first membrane 16 is generally configured to prevent the passage of liquid, dust and other particles into the filter assembly 30 and, therefore, into an enclosure. In some embodiments the first membrane 16 is configured to repel oil. In such embodiments, the first membrane 16 can be oleophobic. The first membrane 16 can have an oleophobicity that provides oleo 4-8 protection from oils/fluids in accordance with ISO 14419.

The first membrane 16 extends over the filter opening 25. The first membrane 16 is directly coupled to the first side 26 of the adhesive layer 24 about the filter opening 25. In various embodiments the first membrane 16 is configured to extend over the breather opening in an enclosure (such as depicted in FIG. 1) and, therefore, can be in direct contact with the environment outside of the enclosure through the breather opening. "Direct contact" is defined herein as lacking intervening materials, layers, or substrates.

In some embodiments the first membrane 16 is a laminate of a membrane and scrim. The first membrane 16 can have polytetrafluoroethylene (PTFE) or expanded polytetrafluoroethylene (ePTFE). In some embodiments the first membrane 16 is a nonwoven polyester. In some embodiments, only one of the two main surfaces of the first membrane 16 has an oleophobic coating, which is the surface that is configured to be exposed to the environment outside of the enclosure. In such an embodiment, the other main surface of the first membrane 16 lacks an oleophobic coating and is non-oleophobic. In some embodiments both surfaces of the first membrane 16 have an oleophobic coating.

The adsorbent element 17 is generally configured to adsorb moisture vapor. In some embodiments the adsorbent element 17 is configured to adsorb acid gas, such as $H_2S$, $SO_2$, and $NO_2$. The adsorbent element 17 can be positioned on the first membrane 16. The adsorbent element 17 is directly coupled to the first membrane 16, such as via an adhesive 23 disposed between the adsorbent element 17 and the first membrane 16. In various embodiments the adsorbent element 17 and the first membrane 16 are coextensive. The adsorbent element 17 is positioned between the first membrane 16 and the second membrane 18.

The adsorbent element 17 can be constructed of various materials and combinations of materials. The adsorbent element 17 can be in the form of a tablet or a web. In some embodiments the adsorbent element 17 has activated carbon. In some embodiments the adsorbent element 17 is an adsorbent material impregnated with a base salt. In some embodiments the adsorbent element 17 is impregnated with potassium carbonate ($K_2CO_3$). Other impregnates that could be used include, but are not limited to: NaOH, KOH, $Na_2CO_3$, $AlCl_3$, $ZnCl_2$, $MgCl_2$, $H_3PO_4$, HCl, $H_2SO_4$, $HNO_3$, KI and $KMnO_4$. In example implementations where the enclosure is an ostomy bag, the impregnate can be KI, NaOH, and/or KOH. The adsorbent element 17 can also be impregnated with and/or treated with other chemical constituents to modify the adsorption of the adsorbent element 17.

The second membrane 18 is configured to facilitate diffusion of air between the adsorbent element 17 and the environment(s) outside of the filter assembly 30, such as the interior of an enclosure. The second membrane 18 generally encapsulates the first membrane 16 and the adsorbent element 17. The second membrane 18 is directly coupled to the first side 26 of the adhesive layer 24 around the first membrane 16 and the adsorbent element 17. In the current embodiment, the second membrane 18 is directly coupled to the first adhesive 19. The second membrane 18 can be coextensive with the adhesive layer 24. In some embodiments, the second membrane 18 is in direct contact with the adsorbent element 17.

The second membrane 18 can be constructed of a variety of materials and combinations of materials. In some embodiments the second membrane 18 is a laminate constructed of a membrane and a scrim layer. The second membrane 18 can be PTFE or ePTFE in various embodiments. In various embodiments the second membrane 18 is non-oleophobic.

STATEMENT OF EXEMPLARY EMBODIMENTS

Embodiment 1

A filter assembly comprising:
a double-sided adhesive layer having a first side and a second side and defining a filter opening;
a first membrane extending over the filter opening and directly coupled to the first side of the double-sided adhesive layer about the filter opening;
an adsorbent element directly coupled to the first membrane, wherein the adsorbent element and the first membrane are coextensive; and
a second membrane encapsulating the first membrane and the adsorbent element, wherein the second membrane is directly coupled to the first side of the double-sided adhesive layer around the first membrane and adsorbent element.

Embodiment 2

The filter assembly of one of embodiments 1 and 3-10, further comprising a manually releasable liner coupled to the second side of the double-sided adhesive layer.

Embodiment 3

The filter assembly of one of embodiments 1-2 and 4-10, wherein the double-sided adhesive layer comprises a carrier layer with a first adhesive disposed on the first side and a second adhesive disposed on the second side.

Embodiment 4

The filter assembly of one of embodiments 1-3 and 5-10, wherein the first membrane is polytetrafluoroethylene (PTFE).

Embodiment 5

The filter assembly of one of embodiments 1-4 and 6-10, wherein the second membrane is PTFE.

Embodiment 6

The filter assembly of one of embodiments 1-5 and 7-10, wherein the first membrane has an oleophobic coating.

Embodiment 7

The filter assembly of one of embodiments 1-6 and 8-10, wherein the adsorbent element comprises activated carbon impregnated with a base salt.

Embodiment 8

The filter assembly of one of embodiments 1-7 and 9-10, wherein the adsorbent element is a tablet.

Embodiment 9

The filter assembly of one of embodiments 1-8 and 10, wherein the adsorbent element is a web.

Embodiment 10

The filter assembly of one of embodiments 1-9, wherein the second membrane is in direct contact with the adsorbent element.

Embodiment 11

A sensor device comprising:
a substantially sealed sensor enclosure defining a sensor opening and a breather opening;
an optical sensor comprising a lens coupled to the sensor enclosure about the sensor opening;
a filter assembly disposed in the sensor enclosure, the filter assembly comprising:
  an adhesive layer coupled to the sensor enclosure about the breather opening, wherein the adhesive layer defines a filter opening overlapping with the breather opening;
  a first membrane extending over the breather opening and directly coupled to the adhesive layer about the filter opening;
  an adsorbent element directly coupled to the first membrane, wherein the adsorbent element and the first membrane are coextensive; and
  a second membrane encapsulating the first membrane and the adsorbent element, wherein the second membrane is directly coupled to the adhesive layer about the first membrane and adsorbent element.

Embodiment 12

The sensor device of one of embodiments 11 and 13-20, wherein the adhesive layer comprises a carrier layer having a first side and a second side and adhesive disposed on the first side and the second side.

Embodiment 13

The sensor device of one of embodiments 11-12 and 14-20, wherein the first membrane is PTFE.

Embodiment 14

The sensor device of one of embodiments 11-13 and 15-20, wherein the second membrane is PTFE.

Embodiment 15

The sensor device of one of embodiments 11-14 and 16-20, wherein the first membrane has an oleophobic coating.

Embodiment 16

The sensor device of one of embodiments 11-15 and 17-20, wherein the adsorbent element comprises activated carbon impregnated with a base salt.

Embodiment 17

The sensor device of one of embodiments 11-16 and 18-20, wherein the adsorbent element is a tablet.

Embodiment 18

The sensor device of one of embodiments 11-17 and 19-20, wherein the adsorbent element is a web.

Embodiment 19

The sensor device of one of embodiments 11-18 and 20, wherein the second membrane is in direct contact with the adsorbent element.

Embodiment 20

The sensor device of one of embodiments 11-19, wherein the sensor device is a lidar sensor.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A filter assembly comprising:
   a double-sided adhesive layer having a first side and a second side and defining a filter opening;
   a first membrane extending over the filter opening and directly coupled to the first side of the double-sided adhesive layer about the filter opening;
   an adsorbent element directly coupled to the first membrane, wherein the adsorbent element and the first membrane are coextensive; and
   a second membrane encapsulating the first membrane and the adsorbent element, wherein the second membrane is directly coupled to the first side of the double-sided adhesive layer around the first membrane and adsorbent element.

2. The filter assembly of claim 1, further comprising a manually releasable liner coupled to the second side of the double-sided adhesive layer.

3. The filter assembly of claim 1, wherein the double-sided adhesive layer comprises a carrier layer with a first adhesive disposed on the first side and a second adhesive disposed on the second side.

4. The filter assembly of claim 1, wherein the first membrane is polytetrafluoroethylene (PTFE).

5. The filter assembly of claim 1, wherein the second membrane is PTFE.

6. The filter assembly of claim 1, wherein the first membrane has an oleophobic coating.

7. The filter assembly of claim 1, wherein the adsorbent element comprises activated carbon impregnated with a base salt.

8. The filter assembly of claim 1, wherein the adsorbent element is a tablet.

9. The filter assembly of claim 1, wherein the adsorbent element is a web.

10. The filter assembly of claim 1, wherein the second membrane is in direct contact with the adsorbent element.

11. A sensor device comprising:
    a substantially sealed sensor enclosure defining a sensor opening and a breather opening;
    an optical sensor comprising a lens coupled to the sensor enclosure about the sensor opening;
    a filter assembly disposed in the sensor enclosure, the filter assembly comprising:
      an adhesive layer coupled to the sensor enclosure about the breather opening,
      wherein the adhesive layer defines a filter opening overlapping with the breather opening;
      a first membrane extending over the breather opening and directly coupled to the adhesive layer about the filter opening;
      an adsorbent element directly coupled to the first membrane, wherein the adsorbent element and the first membrane are coextensive; and
      a second membrane encapsulating the first membrane and the adsorbent element,
      wherein the second membrane is directly coupled to the adhesive layer about the first membrane and adsorbent element.

12. The sensor device of claim 11, wherein the adhesive layer comprises a carrier layer having a first side and a second side and adhesive disposed on the first side and the second side.

13. The sensor device of claim 11, wherein the first membrane is PTFE.

14. The sensor device of claim 11, wherein the second membrane is PTFE.

15. The sensor device of claim 11, wherein the first membrane has an oleophobic coating.

16. The sensor device of claim 11, wherein the adsorbent element comprises activated carbon impregnated with a base salt.

17. The sensor device of claim 11, wherein the adsorbent element is a tablet.

18. The sensor device of claim 11, wherein the adsorbent element is a web.

19. The sensor device of claim 11, wherein the second membrane is in direct contact with the adsorbent element.

20. The sensor device of claim 11, wherein the sensor device is a lidar sensor.

* * * * *